Patented July 12, 1938

2,123,700

UNITED STATES PATENT OFFICE 2,123,700

NONFIBROUS FILM AND METHOD OF MAKING SAME

Nickolai N. Kojevnikoff, Buffalo, N. Y., assignor to E. I. du Pont de Nemours & Company, Wilmington, Del., a corporation of Delaware No Drawing. Application October 22, 1936, Serial No. 107,055

5 Claims. (Cl. 91—68)

This invention relates to improvements in smooth, non-fibrous, non-porous sheets, films and pellicles and the method of making the same. More particularly, the invention relates to the production of cellulosic pellicles, especially water sensitive films formed from aqueous alkaline cellulosic solutions, whereby to greatly enhance certain physical characteristics and consequently, their utility to manufacturer, converter and consumer. The invention will be described in terms of regenerated cellulose sheets and films although it is to be understood that this is illustrative and not limitative.

Regenerated cellulose, if manufactured in the pure form, is characterized by great brittleness and lack of flexibility. Cellulose, however, has a strong affinity for water, and even in the absence of any other softening material will absorb a substantial amount of water from the surrounding atmosphere. If the surrounding atmosphere is of high relative humidity, such as around 95%, the water absorbed contributes sufficient softness so that only comparatively small amounts of additional softener are necessary to make the film commercially useful. In order, however, to make the film flexible and non-brittle at all humidities, a substantial amount of a relatively non-volatile hygroscopic softener, such as glycerin, is customarily impregnated into the film. When this is done, the moisture absorbed by the film at high relative humidities tends to make it more flexible than is actually necessary. However, this does no particular harm except for the fact that it very markedly increases the tendency of superimposed sheets to stick together, particularly when pressure, even though moderate, is applied. This tendency has been a problem affecting the commercial handling of the film for a great many years.

In order to overcome this difficulty, it has been proposed to apply to the surfaces of the film a thin, tenuous coating or "sizing", reducing the tendency of stacked sheets to stick together. Heretofore, most of these sizes or anti-sticking agents have been only of limited effectiveness in preventing sticking and/or are not very receptive to water soluble glues customarily used in the fabrication of packages or the like and/or have a tendency, when applied in too large quantities, of causing haze or blush in the film.

It is therefore an object of this invention to produce thin, non-fibrous, substantially non-porous sheets and films of improved resistance to sticking together and at the same time with little or no impairment of glue receptivity and a minimum amount of haze or blush.

It is a further object to produce such sheets or films having an improved resistance to sticking together in atmospheres of high relative humidity and/or when impregnated with large quantities of a softening agent.

It is a still further object to produce such sheets or films of regenerated cellulose, or other water sensitive cellulosic materials.

It is a still further object to produce new sizing materials for such sheets and films.

Other objects will appear hereinafter.

The objects of this invention are accomplished by sizing said sheets or films with a thin, tenuous coating of a cellulose derivative, particularly a cellulose ester, from an emulsion of said cellulose derivative in water According to the preferred form of this invention, the sizing or anti-sticking agents are applied to transparent regenerated cellulose sheets while such sheets are in the gel state. Preferably this is accomplished by passing the regenerated cellulose in continuous form through a bath containing the sizing or anti-sticking agent in the desired concentration. This is most conveniently done just prior to the drying operation and at the same time as impregnation with a softener, such as glycerin. Before entering the drier, the excess anti-sticking agent, together with the excess softener solution, may be removed by suitable squeeze rollers, scraper rods, doctor knives or the like. The amount of anti-sticking agent which is applied is controlled by adjusting the concentration of the anti-sticking agent in the treating bath, or by varying the amount of excess removed. If it is desired to apply the anti-sticking agent separately, the pellicle may be treated with a softener bath, the excess removed as indicated above and then the emulsion of the anti-sticking agent applied by dip rolls, sprays, or the like. The invention is also applicable to the production of film containing no softener, such softener free film being used for certain special purposes.

In general, those cellulose derivatives which are soluble in organic solvents are preferable, particularly cellulose esters, such as nitrocellulose or cellulose acetate. Preferably only very minute quantities of such cellulose derivatives are applied to the transparent regenerated cellulose pellicle. Such substances, after drying on the pellicle, will usually and preferably amount to less than 2% of the product and may even amount to as little as a few hundredths per cent.

In carrying out the sizing treatment, it is essential that the emulsion be so prepared, that the quantity be so controlled and that drying be so carried out that the final product is substantially not inferior to similar unsized products, particularly in the retention of transparency and brilliance and receptiveness to the usual aqueous adhesives. Furthermore, the product should resist cohesion, such as caking of stacked sheets when stored under pressure and/or exposed to atmospheres of high humidity, as much as or more than similar unsized sheets even though the product may contain as much as twice the quantity of softening agent as the unsized product. For this reason many restrictions are placed on the sizing or anti-sticking composition.

The cellulose derivative emulsion may be prepared by any known method, such as that described in U. S. Patents Nos. 1,589,327 and 1,970,572. Examples of methods of so preparing such emulsions are given herewith:

Example I

Ten parts of pyroxylin (½") are dissolved in a mixture of 60 parts of isobutyl acetate and 20–30 parts of toluene. An emulsifier is prepared by mixing 3 parts of Monopole oil and 200 parts of water with vigorous stirring for a period of 5 minutes. The pyroxylin solution is gradually added to the emulsifier with continuous vigorous stirring. The resulting emulsion is then ground in a colloid mill for a period of 5 minutes.

Example II

The same procedure is followed as in Example I, except that ¼ part of gum arabic is added as a protective colloid to the emulsifier, before the pyroxylin solution is added.

Example III

The same procedure is followed as in Example I, except that 2 parts of butyl alcohol are added to the emulsifier.

Film sized with this composition tends to have less blush and haziness than film sized with the composition of Example I.

Example IV

Five parts of cellulose acetate having an acetic acid content of 56.0–56.4% are dissolved in a mixture of 86 parts of aniline and 30 parts of toluene. This solution is gradually added to an emulsifier, prepared as in Example I, with continuous vigorous stirring. The resulting emulsion is ground as in Example I.

Example V

Five parts of cellulose acetate having an acetic acid content of 56.0–56.4% are dissolved in a mixture of 120 parts of tetrachlorethane and 20 parts of toluene. An emulsifier is prepared by mixing 1½ parts of Monopole oil, ½ part of gum arabic and 200 parts of water with vigorous stirring for a period of 5 minutes. The cellulose acetate solution is gradually added to the emulsifier with continuous vigorous stirring. The resulting emulsion is ground as in Example I.

The concentrated emulsion formed in accordance with any of the above or similar examples is then ready for use in the practice of this invention. The amount of cellulose derivative present in the emulsion and necessary to form the desired concentration in the final product is customarily between 0.05 and 3.0% and preferably between 0.5 and 1.5%. The following example illustrates a mode of procedure in accordance therewith.

Example VI

A concentrated emulsion in accordance with any of the above examples is added to and mixed with an aqueous bath containing 7.5% of glycerin, in an amount sufficient to give a final concentration of 1.0% cellulose derivative. The film to be treated is then passed through this bath, preferably while in the gel state, in the ordinary manner, dried and wound up into rolls.

As has been indicated above, cellulosic pellicles of the type described which are dense, non-fibrous and substantially impermeable possess a remarkably smooth surface. Customarily such pellicles are dried by passing them in a continuous manner over a series of drier rollers, and the surface of these rolls is usually smooth so that the surface of the pellicle will not be marred during its passage thereover. As the pellicle is dried, it tends to shrink in width, and with smooth rollers the shrinkage is more or less unrestricted in the case of the usual untreated pellicle so that considerable loss in width is experienced. It might be expected therefore that a pellicle treated in accordance with the present invention to improve the sticking resistance would present a still smoother surface to the drier rollers and would result in even greater shrinkage as the pellicle is dried. It has been found, however, and surprisingly so that many of the sizing or other antisticking compositions within the scope of the invention are capable of preventing this shrinkage to such an extent as will result in substantially no greater loss in width than would be experienced if no sizing treatment were given. This can be done without sacrificing the improvement in sticking resistance and receptivity of the pellicle to the usual aqueous adhesives, such as one containing dextrin, calcium chloride and glycerin.

It will be seen from the foregoing that in the preparation of the product it is necessary to overcome certain obstacles which are not encountered in any other product now known. Whereas stacks of transparent regenerated cellulose sheets are readily caked or stuck together by increases in moisture or pressure, paper, being porous, less hygroscopic and relatively rough in surface, exhibits no such action. Even the glassine papers which most nearly approach transparent regenerated cellulose film are free from caking or sticking. Cohering and gluing of transparent regenerated cellulose sheets differ widely from any such problem which has been encountered in the paper field. Even the densest of papers is sufficiently porous so that a wide variety of adhesives, for example starch, casein, dextrin and gelatin agglutinants provide suitable adhesion. Plain transparent regenerated cellulose sheets, on the other hand, are smooth, non-fibrous and impervious to the usual colloidal agglutinant products and hence require specially compounded adhesives to secure proper adhesion of the smooth and substantially impermeable surface. Therefore, sizing or anti-sticking agents which would in no way affect the gluing properties of glassine paper, for example, would so prevent the wetting and adhesion of an aqueous adhesive on the surface of transparent regenerated cellulose pellicles that no useful adhesion whatsoever would result. It thus becomes apparent that the sizing or anti-sticking agents which will improve the sticking resistance of regenerated cellulose pellicles and at the same time permit the pellicles to remain receptive to aqueous adhesives which are satisfactory for use with untreated pellicles constitutes an outstanding contribution to the art. Needless to say, there are many uses to which cellulosic pellicles of the type described might be put wherein the antisticking characteristic is of major import while the receptivity to aqueous adhesives is of little concern. In such cases, a pellicle having improved sticking resistance, regardless of its receptivity to aqueous adhesives, will be useful, and the production of such pellicles comes well within the scope of the present invention.

Likewise, the adhesion of printing inks to surfaces of transparent, regenerated cellulose pellicles is often greatly impaired except where the gluable compositions of the present invention are employed.

Certain treatments have been developed for imparting moistureproofness and/or waterproofness to transparent regenerated cellulose sheets. While these treatments may generally be applied to highly softened sheets to produce transparent, sticking-resistant products, they invariably result in products which cannot be glued with commercial aqueous adhesives. Furthermore, such processes require a second step, as of applying lacquers after the film has been dried and wound up. One very practical feature of the process of this invention is that it may be carried out at practically no increase in cost and without any alteration in the machine usually used for producing transparent regenerated cellulose sheets or in the method for subsequent handling by the manufacturer or converter or consumer.

Although this invention has been described in terms of sizing gel film, it may also be applied to film which has been dried and rewetted. However, this procedure is generally to be avoided since it necessitates an additional step in the manufacture, thus increasing the cost. It is also applicable to other smooth, non-fibrous, non-porous sheets and films which, because of their high content of softener, have a tendency to stick together, particularly water sensitive pellicles cast from aqueous cellulosic solutions, including lowly substituted cellulose ethers, esters and ether-esters, such as glycol cellulose, methyl cellulose, ethyl cellulose, cellulose glycolic acid, and cellulose phthalic acid.

It is to be understood that all other variations or modifications which conform to the spirit of the invention are intended to be included within the scope of the claims.

I claim:

1. A method of treating non-fibrous, non-porous, water sensitive film comprising immersing said film in an aqueous bath containing 0.05 to 3.0% cellulose derivative emulsified therein, whereby to deposit on said film a cellulose derivative size.

2. A method of treating non-fibrous, non-porous, water sensitive cellulosic film comprising immersing said film in an aqueous bath containing 0.05 to 3.0% cellulose derivative emulsified therein, whereby to deposit on said film a cellulose derivative size.

3. A method of treating regenerated cellulose film comprising immersing said film in an aqueous bath containing 0.5 to 1.5% cellulose derivative emulsified therein, whereby to deposit on said film a cellulose derivative size.

4. A method of treating regenerated cellulose film comprising immersing said film in an aqueous bath containing 0.5 to 1.5% nitrocellulose emulsified therein, whereby to deposit on said film a nitrocellulose size.

5. A method of treating regenerated cellulose film comprising immersing said film in an aqueous bath containing 0.5 to 1.5% cellulose acetate emulsified therein, whereby to deposit on said film a cellulose acetate size.

NICKOLAI N. KOJEVNIKOFF.